(12) United States Patent
Biegelsen

(10) Patent No.: US 7,250,954 B2
(45) Date of Patent: Jul. 31, 2007

(54) THREE-DIMENSIONAL IMAGE RENDERING DEVICES AND METHODS

(75) Inventor: David K. Biegelsen, Portola Valley, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 218 days.

(21) Appl. No.: 11/012,477

(22) Filed: Dec. 16, 2004

(65) Prior Publication Data

US 2006/0132497 A1    Jun. 22, 2006

(51) Int. Cl.
*G06T 15/00* (2006.01)

(52) U.S. Cl. .......................... 345/589; 345/85; 348/51; 348/59; 359/463

(58) Field of Classification Search .................... 345/8, 345/31, 85, 419, 589; 359/463; 348/51, 348/59; 353/7
See application file for complete search history.

(56) References Cited

U.S. PATENT DOCUMENTS

| | | | |
|---|---|---|---|
| 4,160,973 A | | 7/1979 | Berlin, Jr. .................... 340/718 |
| 4,987,487 A | * | 1/1991 | Ichinose et al. ............... 348/59 |
| 5,506,597 A | * | 4/1996 | Thompson et al. ........... 345/85 |
| 5,581,271 A | * | 12/1996 | Kraemer ......................... 345/8 |
| 5,661,599 A | * | 8/1997 | Borner ......................... 359/463 |
| 5,663,740 A | * | 9/1997 | Brotz ........................... 345/31 |
| 5,930,037 A | * | 7/1999 | Imai ............................ 359/463 |
| 6,765,566 B1 | * | 7/2004 | Tsao ............................ 345/419 |
| 7,123,287 B2 | * | 10/2006 | Surman ........................ 348/51 |
| 7,168,809 B2 | * | 1/2007 | Hoshino et al. ............... 353/7 |

* cited by examiner

*Primary Examiner*—Phu K. Nguyen
(74) *Attorney, Agent, or Firm*—Oliff & Berridge, PLC

(57) ABSTRACT

A three-dimensional rendering device may project an image on a movable display through a collimating device, which collimates the rays from the display into a narrow solid angle. The narrow solid angle may allow the rays from the display to be projected only to a viewer located at a particular position relative to the display. As the display moves, the information displayed may change to be that appropriate for the particular position, so that a three-dimensional image of the object may be perceived by the viewer as the viewer changes positions around the three-dimensional rendering device.

22 Claims, 12 Drawing Sheets

THREE-DIMENSIONAL IMAGE RENDERING DEVICES AND METHODS

BACKGROUND

1. Field

This invention relates to the rendering of three-dimensional images of surfaces or scenes.

2. Description of Related Art

Three-dimensional rendering of surfaces or scenes is often desirable in order to communicate to a viewer the three-dimensional shape of the surface of an object. Providing different three-dimensional rendering for different viewing angles provides a sense of three-dimensionality of the objects represented. A depth perspective may be provided by giving different (stereoscopic) image information to one eye, say the left eye, compared to the image information given to the other eye, the right eye. The viewer's brain then interprets the difference in the image perceived by the left eye, compared to the image perceived by the right eye, as a difference in depth to the object surface.

A variety of other methods for rendering a three-dimensional image from a two-dimensional display are known, such as that disclosed in U.S. Pat. No. 4,160,973 to Berlin. Berlin discloses a three-dimensional image rendering device in which a three-dimensional image is generated by a two-dimensional display that is moved to achieve the effect of three dimensions. The three-dimensional effect is achieved by adjusting the intensity of the light sources on the two-dimensional display as the display rotates. The three-dimensional image is a composite of the different images applied to the display, wherein the persistence of the two-dimensional images in the eyes of the viewer causes the image to appear three-dimensional.

SUMMARY

However, approaches such as that disclosed in Berlin suffer from a number of disadvantages. For example, in Berlin the light sources radiate into a wide space and can therefore be observed from many viewpoints. Solid objects thus appear transparent. Furthermore, Berlin's method does not allow one to render a true stereoscopic view of an object. The use is limited in fact to displaying time varying motion of points of light, such as might be desired for an air traffic control display.

Systems and methods for rendering a three-dimensional image may comprise using a flat panel display that moves relative to an observer. The three-dimensional image may be viewable by one or more observers located at any of a number of positions adjacent to the moving three-dimensional rendering device.

Movement of the three-dimensional rendering device may be provided by mounting a display on a rotation axis, for example, and driving the rotational motion using a motor. Other means of moving the three-dimensional rendering device may also be employed.

The three-dimensional rendering device may operate by collimating the light output by a flat panel display into a narrow cone of emission. The image displayed by the display may be updated as the display rotates through various angular positions, for example, and may provide the image appropriate for a viewer located at each particular position around the object. Accordingly, as the viewer changes his position around the object, for example, by walking side-to-side, or to the back of the display, the viewer perceives a side-to-side view or a rear view of the object being displayed.

Furthermore, if the cone of emission is sufficiently narrow, the image perceived by a viewer's left eye may be distinct from the image perceived by the viewer's right eye. By displaying different image information for an angle seen by the left eye compared to image information for an angle seen by the right eye, a true stereoscopic image may be perceived by the viewer. This approach is distinctly different from that described in Berlin, which makes no attempt to provide an image with hidden surfaces to a viewer at a particular viewing angle.

The light may be collimated, for example, by placing a microchannel collimating array adjacent to light sources of the display, or by making the light sources themselves output highly collimated light. The microchannel collimating array may be an array of long aspect ratio tubes, which transmit only light which is traveling nearly along the axis of the tubes. Alternatively, output of a plurality of light emitting diodes may be collimated by a lenslet array.

The three-dimensional rendering device may comprise a plurality of flat panels, each rotating on a common axis. The use of a plurality of panels may reduce the rate at which the three-dimensional rendering device is rotated in order for a steady, non-flickering image to be perceived by the viewer.

These and other features and advantages are described in, or are apparent from, the following detailed description.

BRIEF DESCRIPTION OF THE DRAWINGS

Various details are described below, with reference to the following figures, wherein.

DETAILED DESCRIPTION OF EXEMPLARY EMBODIMENTS

Various exemplary systems and methods are disclosed which may provide a three-dimensional video image to a plurality of locations adjacent to a moving three-dimensional rendering device.

Figure 1:
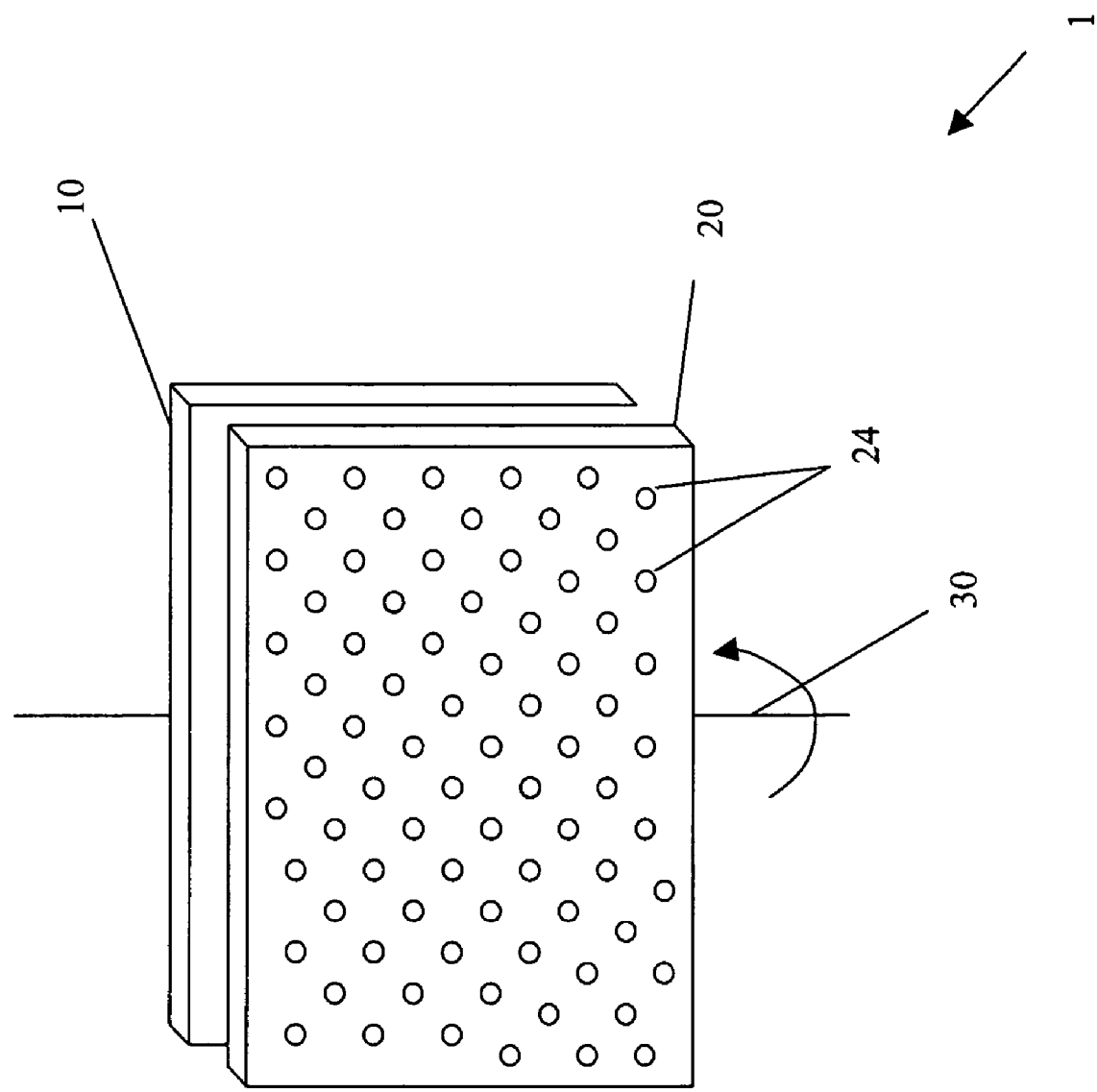
FIG. 1 is a perspective view of an exemplary three-dimensional rendering device.

FIG. 1 shows a perspective view of an exemplary three-dimensional rendering device 1. The rendering device 1 may include a flat panel display 10, which may comprise the light source for the three-dimensional rendering device 1. Adjacent to flat panel display 10 may be disposed a microchannel collimating array 20, with a plurality of tube-like voids 24 formed therein. The tube-like voids 24 may be formed with walls that absorb light traveling at an angle off the central axis of the tube-like void. Therefore, light transmitted through microchannel collimating array 20 may be generally collimated in a direction normal to the surface of microchannel collimating array 20. In other words, the light emitted from microchannel collimated array 20 may diverge only into a narrow solid angle from the central axis of each tube-like void 24. This solid angle may define a cone of illumination of the respective microchannel tube-like void 24, which may be determined largely by the aspect ratio of the respective tube-like void 24 in the microchannel collimating array 20. The cone of illumination is discussed in greater detail below with respect to FIG. 6.

Flat panel display 10 and microchannel collimating array 20 may be mounted to rotate about an axis of rotation 30 for three-dimensional rendering device 1. A motor (not shown) may be used to power the rotation of three-dimensional rendering device 1. It should be understood that FIG. 1 is only an example of three-dimensional rendering device 1, and other implementations may be envisioned. For example, three-dimensional rendering devices may be envisioned which have other means of motion, such as linear or reciprocating motion.

Figure 2:
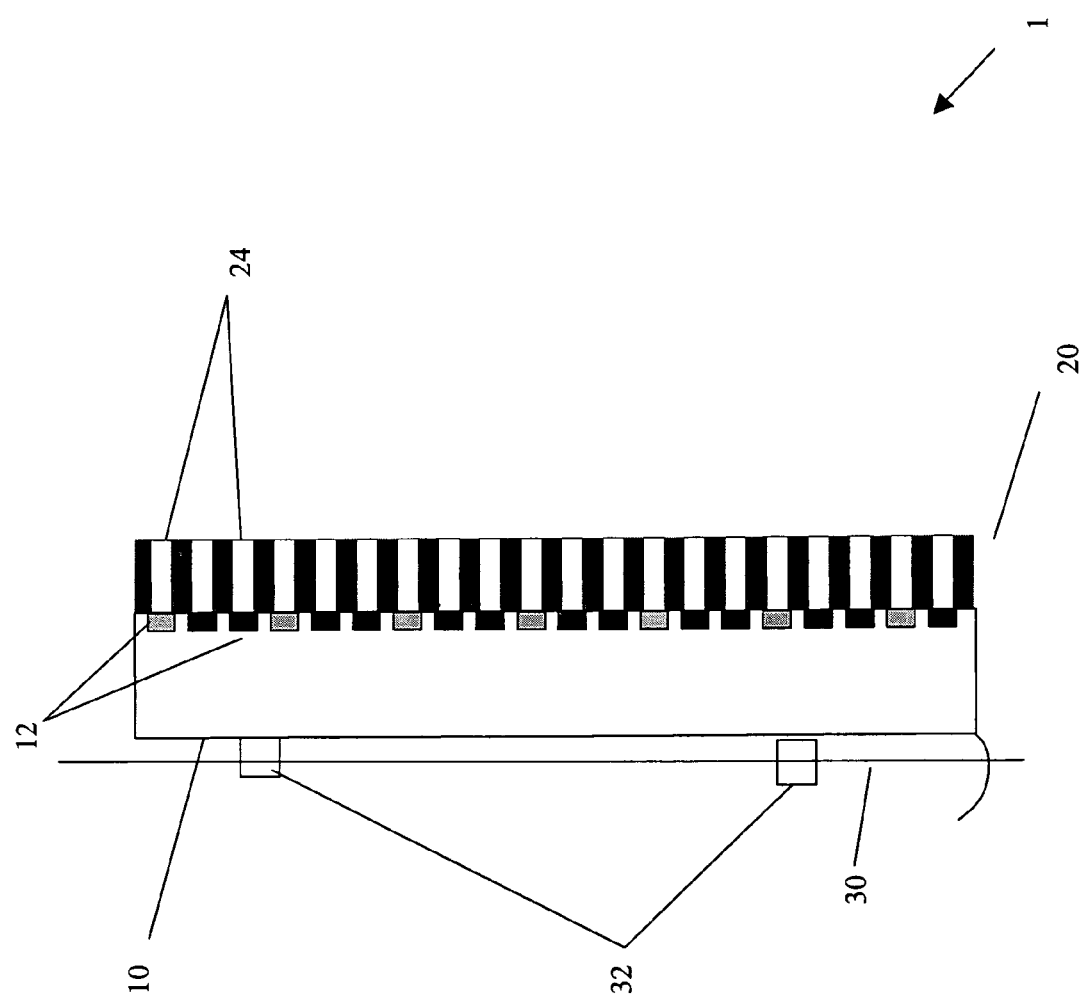
FIG. 2 is a side view of the three-dimensional rendering device of FIG. 1.

FIG. 2 shows a side view of the three-dimensional rendering device 1 of FIG. 1. As shown in FIG. 2, the tube-voids 24 formed in the microchannel collimating array 20 are registered above or adjacent to locations of color elements 12 of flat panel display 10. Flat panel display 10 may be a liquid crystal display, a plasma display, or any other light emissive pixel array. One may use arrays of tube-voids 24 in which there are many tubes per pixel, or in which there is only one aligned with each pixel. The microchannel collimating array may be of an elastic material, for example, and may be formed according to the methods set forth in U.S. application Ser. No. 10/980,334, hereby incorporated by reference in its entirety. Each tube-like void 24 may transmit light from one color element 12 of a pixel. Alternatively, each tube-like void 24 may have a diameter sufficient to cover a plurality of color elements 12, and therefore may transmit a mixture of light colors rather than a single color as shown in FIG. 2.

Three-dimensional rendering device 1 may be made rotatable, for example by coupling to an axle 30 by coupling devices 32, which may include, for example, pins, screws, gears, wheels, belts, bearings, or other mechanisms.

Figure 3:
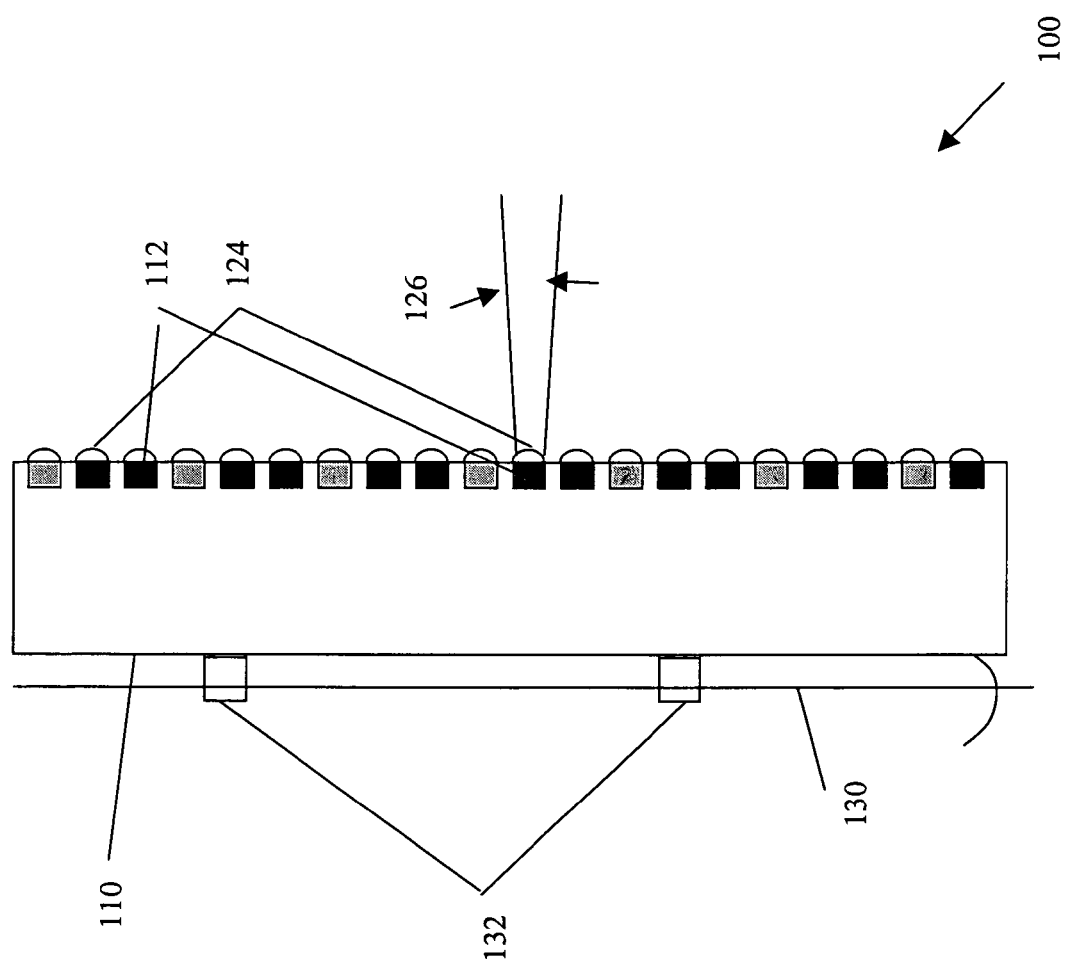
FIG. 3 is a diagram of another exemplary three-dimensional rendering device, using an array of laser diodes and collimating lenslets.

FIG. 3 illustrates another exemplary three-dimensional rendering device 100. In three-dimensional rendering device 100, light source 110 comprises an array of light emitting diodes 112 that emit light into a narrow cone of emission. Disposed adjacent to light emitting diodes 112 are lenslets 124, which are small collimating lenses that collimate or focus the light output by each light emitting diode 112. The light emitted by lenslets 124 may be substantially collimated into a cone of illumination 126. The cone of illumination may have a cone angle which is positive, negative or zero (i.e. the cone of illumination is a cylinder). Each light emitting diode 112 may output one of the colors red, green or blue, as shown in FIG. 3. The eye of a viewer intercepts the light output by several of the light emitting diode 112, which the eye then perceives as the intended color with the appropriate mixture of the red, green and blue colors. The number of light emitting diodes 112 seen by the eye of a viewer depends on the cone of illumination 126 of the light emitting diodes 112 and the location/position of the viewer. It should be understood that light emitting diodes 112 may also include laser diodes.

Three-dimensional rendering device 100 may be made rotatable by mounting on a rotation axle 130, for example, by coupling means 132. A motor (not shown) may drive three-dimensional rendering device 100 to rotate on the rotation axle 130.

Figure 4:
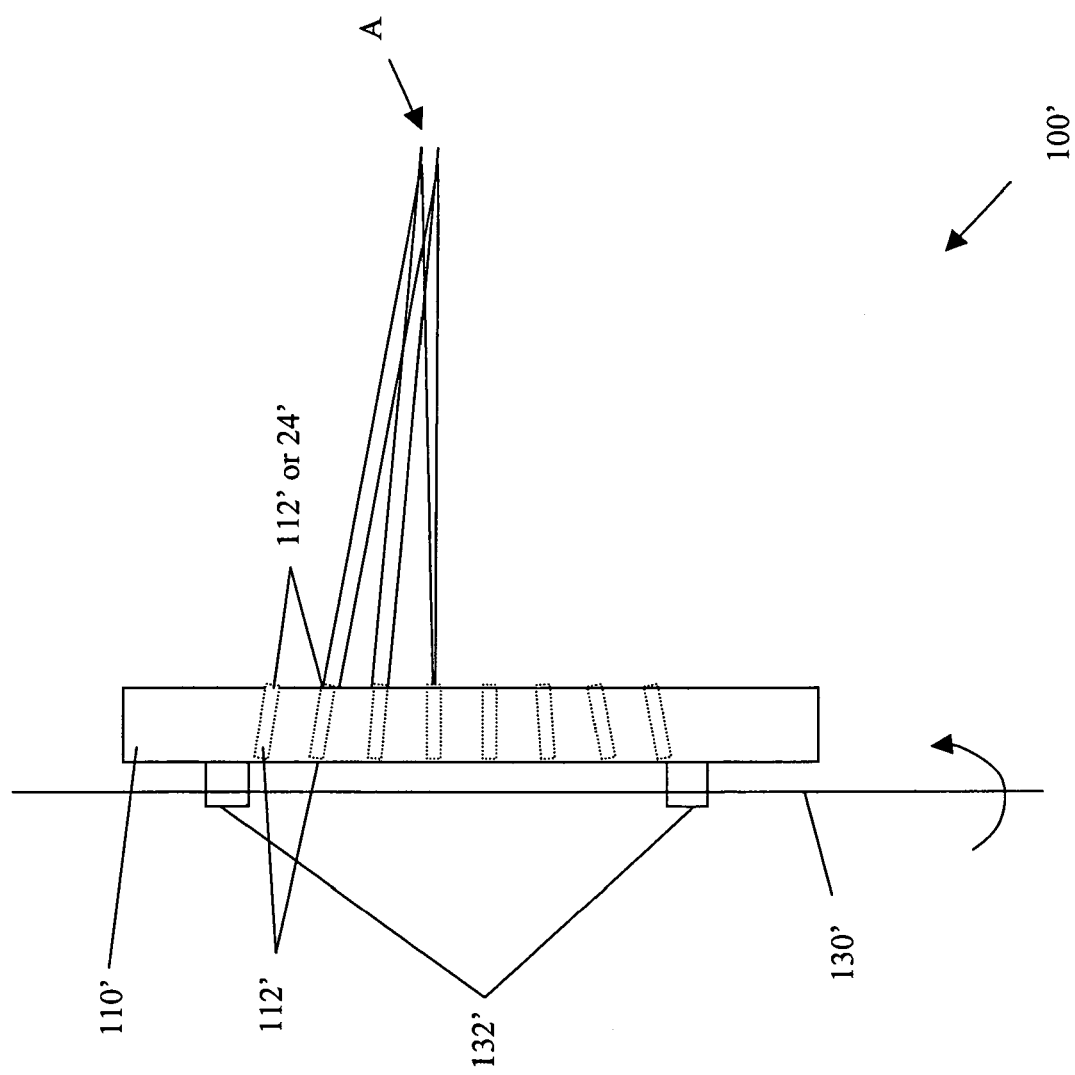
FIG. 4 is a diagram of another exemplary three-dimensional rendering device, wherein output of light sources is directed to converge at a predefined location.

FIG. 4 shows yet another exemplary three-dimensional rendering device 100', in which the axes of light emitting diodes 112' or tube-like voids 24' of the collimating array are not parallel. Instead, the axes of light emitting diodes 112' or tube-like voids 24' of the collimating array are arranged such that their output rays converge at a particular spot, labeled "A" in FIG. 4. In other words, the cones of illumination of the tube-like voids overlap the same spot. This increases the width of the pixel array that can be observed by a viewer at a particular location, but requires the viewer to be located near this location in order to see the image. Like three-dimensional rendering devices 1 and 100, three-dimensional rendering device 100' may be made rotatable by mounting on a rotation axle 130' with coupling means 132'.

It should be understood that the effect of the overlapping cones of illumination achieved by three-dimensional rendering device 100' may also be achieved using three-dimensional rendering device 100, depicted in FIG. 3, by offsetting the lenslets 124 from the axis of their associated light emitting diodes 112. For example, assuming there is a central light emitting diode and associated lenslet, which directs light substantially perpendicularly to the surface of the display, the next adjacent lenslet may be offset slightly from the axis of its associated light emitting diode, so as to direct the cone of illumination of the associated light emitting diode onto a spot substantially overlapping the cone of illumination of the central light emitting diode. Then, the next adjacent lenslet (i.e. two pixels away from the central light emitting diode and lenslet) may be slightly more offset from the axis of its associated light emitting diode, so that the cone of illumination from this light emitting diode also substantially overlaps the cone of illumination of the central light emitting diode. By constructing the three-dimensional rendering device 100 in this way, it may also have the effect of directing most if not all of the light generated by light emitting diodes to the same spot, in a fashion similar to three-dimensional rendering device 100'.

Figure 5:
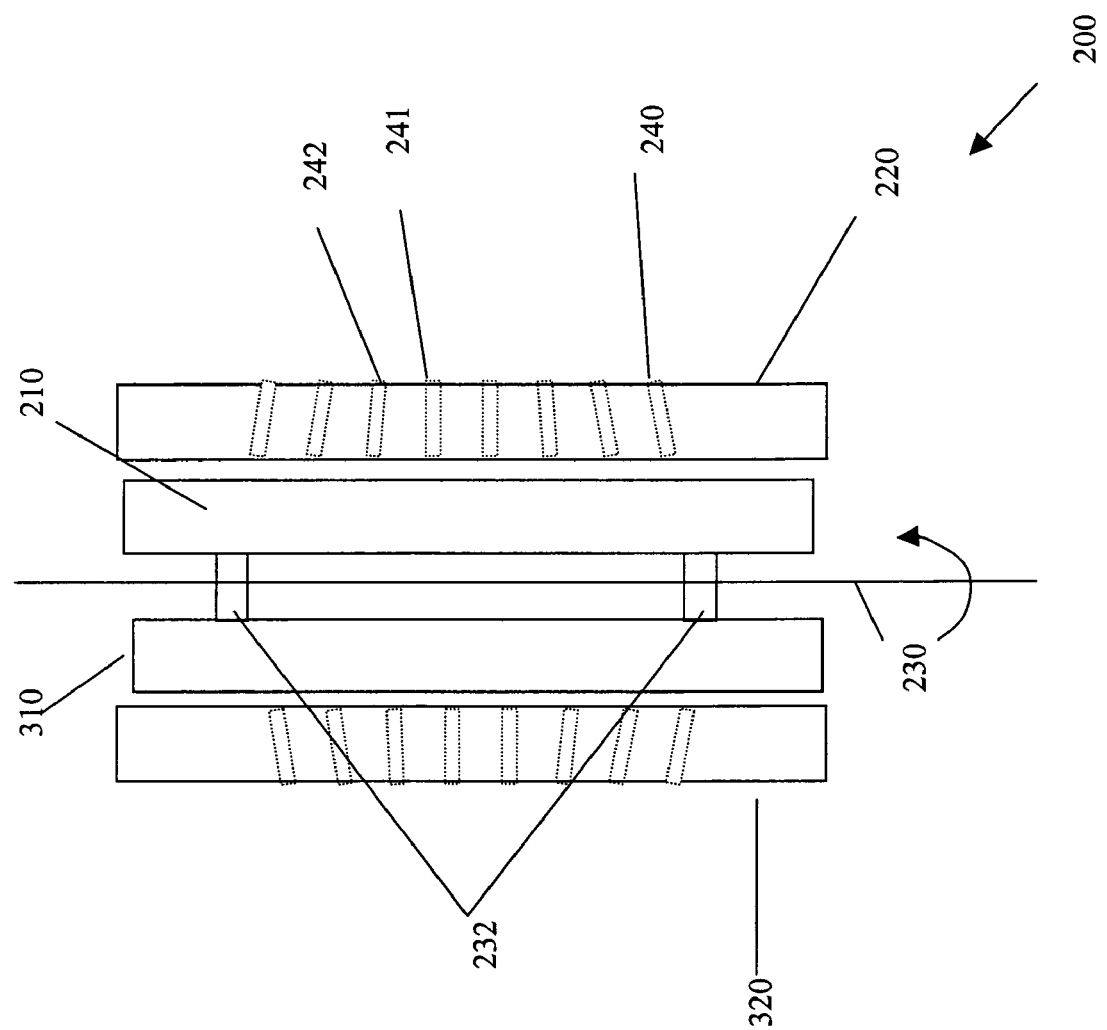
FIG. 5 illustrates another exemplary three-dimensional rendering device, using two flat panel displays coupled to a common rotation axis.

FIG. 5 illustrates another exemplary three-dimensional rendering device 200. Three-dimensional rendering device 200 may include two flat panel displays 210 and 310, along with two microchannel collimating arrays 220 and 320 associated with each flat panel display 210 and 310, respectively. For clarity of description, collimating arrays 220 and 320 are depicted as type 100' shown in FIG. 4, with the cone of illumination of each tube-like void 240, 241 and 242 converging at a particular spot. However, it should be understood that microchannel collimating arrays 220 and 320 may also have parallel tube-like voids, such as depicted in three-dimensional rendering device 100 shown in FIG. 3.

Flat panel displays 210 and 310 may be arranged to rotate about an axis 230 by the application of a driving force, for example, by a motor (not shown). Microchannel collimating array 220 may include a plurality of tube-like voids 240, 241 and 242 shown in FIG. 5. Three-dimensional rendering device 200 may be made rotatable by mounting on an axle 230 by coupling means 232.

Figure 6:
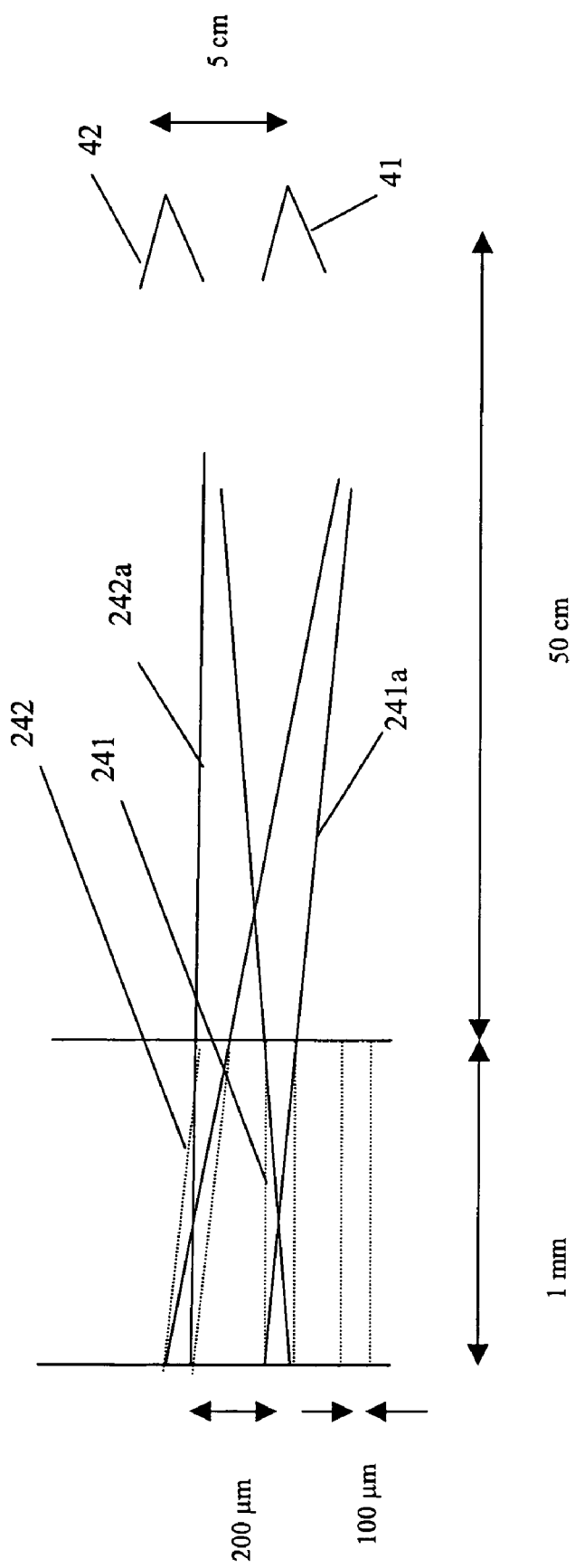
FIG. 6 is a diagram illustrating overlap of a cone of illumination of adjacent pixels of the three-dimensional rendering device of FIG. 5.

Each tube-like void 241, 242 directs light into a narrow cone of illumination 241a and 242a, respectively, as shown in further detail in FIG. 6. Tube-like voids 241, 242 may have a length of about 1 mm and a diameter of about 100 μm, for example. Therefore, tube-like voids 241 and 242 may have an aspect ratio of about 10:1, and therefore each directs light into a beam with a full width half maximum (FWHM) of about 6 degrees. This angular width defines cones of illumination 241a and 242a, that is, the regions which will be illuminated by light from tube-like voids 241 and 242, respectively. Any observer located such that his eye 41 is within cone of illumination 241a and 242a of tube-like voids 241 and 242, will see light transmitted from the flat panel display 210 through the tube-like voids 241 and 242.

To the extent that cone of illumination 241a of one tube-like void 241, overlaps cone of illumination 242a of light from another, adjacent tube-like void 242, the light from both tube-like voids 241 and 242 will be perceived by the viewer whose eye is located within the overlapping cones of illumination illustratively labeled 241a and 242a in FIG. 6. Thus, tube-like voids 241 and 242 display information intended only for this angular location. A viewer whose eye 41 is located within this cone of illumination will see the image intended for this angular location. The viewer's other eye 42 will see no light when the display is in position to project light into eye 41, as shown.

The information displayed by the pixels may be information generated by an image generating apparatus, which is appropriate for the eye of a viewer located at that particular angle. The image generating apparatus determines the image seen by the eye upon viewing a three-dimensional object in space, from a particular vantage point. The image generating apparatus may be, for example, an image processing device coupled to a computer assisted design (CAD) tool, used to design the three-dimensional object. The image generating apparatus, having information as to the location of a surface under design with the CAD tool, may generate the display information which approximates the view seen by the eye, at a particular angle from the object.

The image generating apparatus may also be coupled to a source of medical diagnostic information, such as diagnostic x-rays or computer assisted tomography (CAT) scans. This data may be rendered by the image generating apparatus to generate appropriate images which would be viewed by the eye, from a particular angle, of the surface imaged by the medical diagnostic tool.

Alternatively, video data may be captured by a plurality of video cameras located at the angular positions around the object. The video images from each video camera may be stored separately. The video image corresponding to the a video camera at one particular angle may be displayed by the rotating display, when the display arrives at the particular angle appropriate for display of the information generated by that particular video camera.

FIG. 6 illustrates the operation of three-dimensional rendering device 200, before device 200 is rotated, for example, by a rotating motor. At a particular time t=0, the rotational angle of three-dimensional rendering device 200 is at its initial phase angle, shown in FIG. 6. At this point, pixel 241 displays image information intended to be presented to eye 41 of a viewer located at a first azimuthal position $\omega=\omega_0$. This position at $\omega=\omega_0$ may be referred to as the first valid viewing position for viewing three-dimensional rendering device 200.

Figure 7:
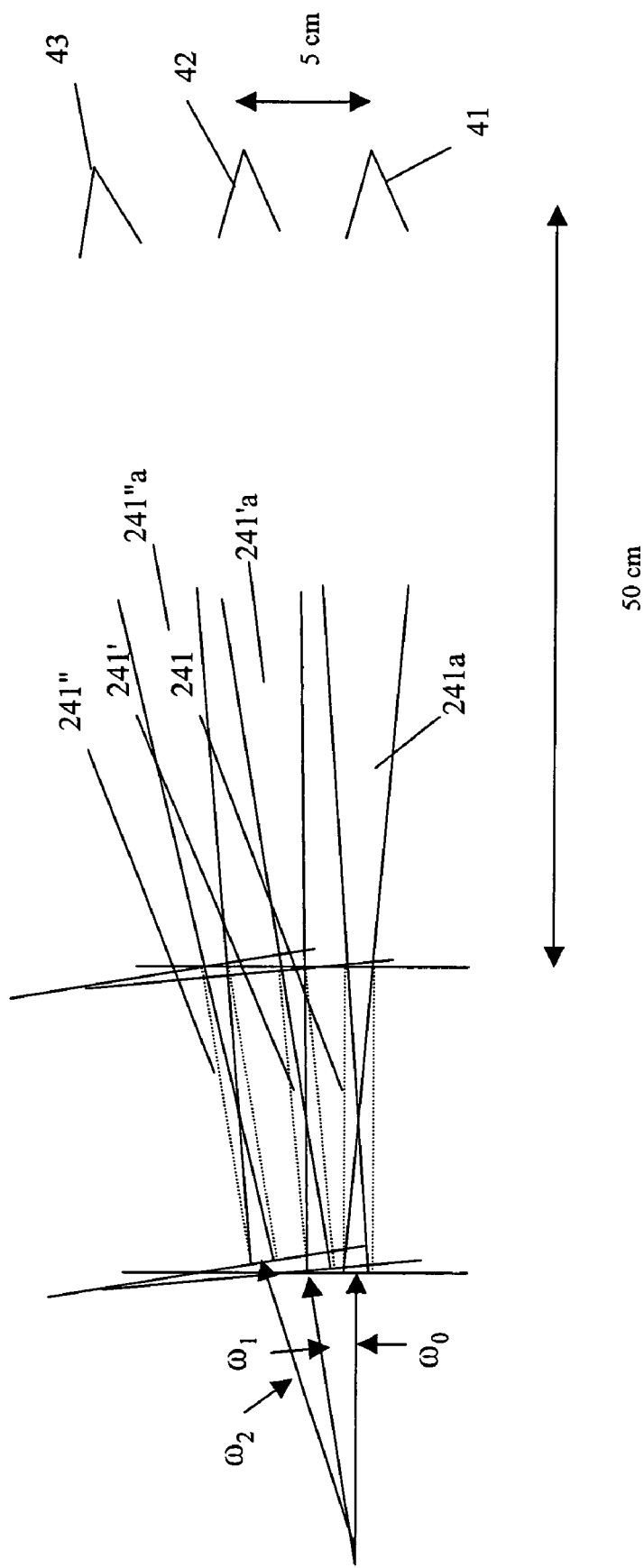
FIG. 7 is a diagram illustrating sweep of the cone of illumination of a pixel as the three-dimensional rendering device of FIG. 5 is rotated.

As the three-dimensional rendering device 200 rotates, pixel 241 continues to display this information as the three-dimensional rendering device is swept through an arc of rotation that moves the cone of illumination 241a and beyond the location of the viewer's left eye 41. Three-dimensional rendering device 200 then rotates into a position directing the light from pixel 241 into the viewer's right eye 42. This situation is illustrated in FIG. 7. At this point, if the same information were to be continued to be displayed by the pixels 241 when the tube-like void has rotated into position 241', the same information would be directed into the viewer's right eye 42, as was directed into the viewer's left eye 41.

Although this type of operation may be acceptable for some applications, and may still render three-dimensional images as the viewer's position around three-dimensional rendering device 200 changes, true stereoscopic images may also be displayed by refreshing the information displayed when the three-dimensional rendering device rotates into a position from which the pixel 241 directs image information into the viewer's right eye.

In order to provide stereoscopic images, the information displayed by three-dimensional rendering device 200 may change as the device rotates from the position at which the display is directed at a viewer's left eye to the position at which the display is directed to the viewer's right eye. Referring to FIG. 7, this means that when the three-dimensional rendering device is rotated to an angle $\omega_1$, where $\omega_1$ is the angle such that the pixel 241 is directed into the viewer's right eye 42, the display is updated with display information appropriate for the angle at which the viewer's right eye 42 is located. Therefore, the information received by the viewer's left eye 41 and right eye 42, respectively, is different and strongly stereoscopic, as the information is appropriate to what would be seen by a viewer viewing the actual object. This information is displayed until a next angular position $\omega_2$ is reached, where $\omega_2$ is a next valid viewing position where a viewer's eye 43 may be located. This angle $\omega_2$ corresponds to position 241" of the tube-like void 241, so that its cone of illumination falls on the eye 43 of a viewer in the next valid angular position. The pixel in position $\omega_2$ would display image information appropriate for a viewer's eye located in position 43. In general, the next valid viewing position is separated from each preceding valid position by a distance less than or approximately the same as the nominal separation between the viewers' eyes.

According to the above description, information is displayed by three-dimensional rendering device 200 according to the angle of rotatation of three-dimensional viewing device 200. In the example described above, there are N viewing angles at which N different sets of image information are displayed. Preferably, the value of N is chosen such that different information is presented to a viewer's left eye as was presented to a viewer's right eye, to achieve a stereoscopic effect. However, it should be understood that N may be chosen for any of a number of other reasons, for example, in order to reduce the refresh rate for the pixels to a practical or cost-effective number, or to increase the angular continuity of viewing (the number of valid positions).

Video images may be displayed by three-dimensional rendering device 200 by updating the image information with a new frame of image information upon the completion of, for example, a full 360 degree rotation of the three-dimensional rendering device 200. The completion of a full 360 rotation may be determined by an optical switch 250, having an optical beam output 250a and optical beam detector 250b. The rotation of a protrusion 240 attached to the device 200, for example, affixed to a rotational axle, interrupts the beam traveling from beam output 250a to beam detector 250b, once per revolution of the three-dimensional rendering device 200. Therefore, the optical switch 250 may output an index signal which is coincident with the rotation of the device 200. Alternatively, a rotary position encoder may be provided with the motor (not shown) for rotating three-dimensional rendering device 200, which may detect the rotary position of the three-dimensional rendering device 200 continuously.

The display of viewing information at angular intervals results in a plurality of "sweet spot" locations, corresponding to the valid angular positions mentioned above, at which viewing of the device is enhanced. A viewer located at any of these sweet spots will perceive the intended three-dimensional view of the object appropriate for that viewing location or sweet spot. For viewers located at locations other than the sweet spots, a diminished intensity image will be perceived because the viewer is outside the cone of illumination, or because the pixel information is being refreshed. As illustrated in FIG. 7, the start of the sweet spot location is at $\omega=\omega_0$, and the end of the sweet spot location is just before $\omega=\omega_1$. The next sweet spot location starts at $\omega=\omega_1$ and may extend for the same arc as the first sweet spot location. If the period required for refresh is only approximately 1% of the period during which the pixels display the image information, then only 1% of the viewing locations will perceive the diminished intensity.

Figure 8:
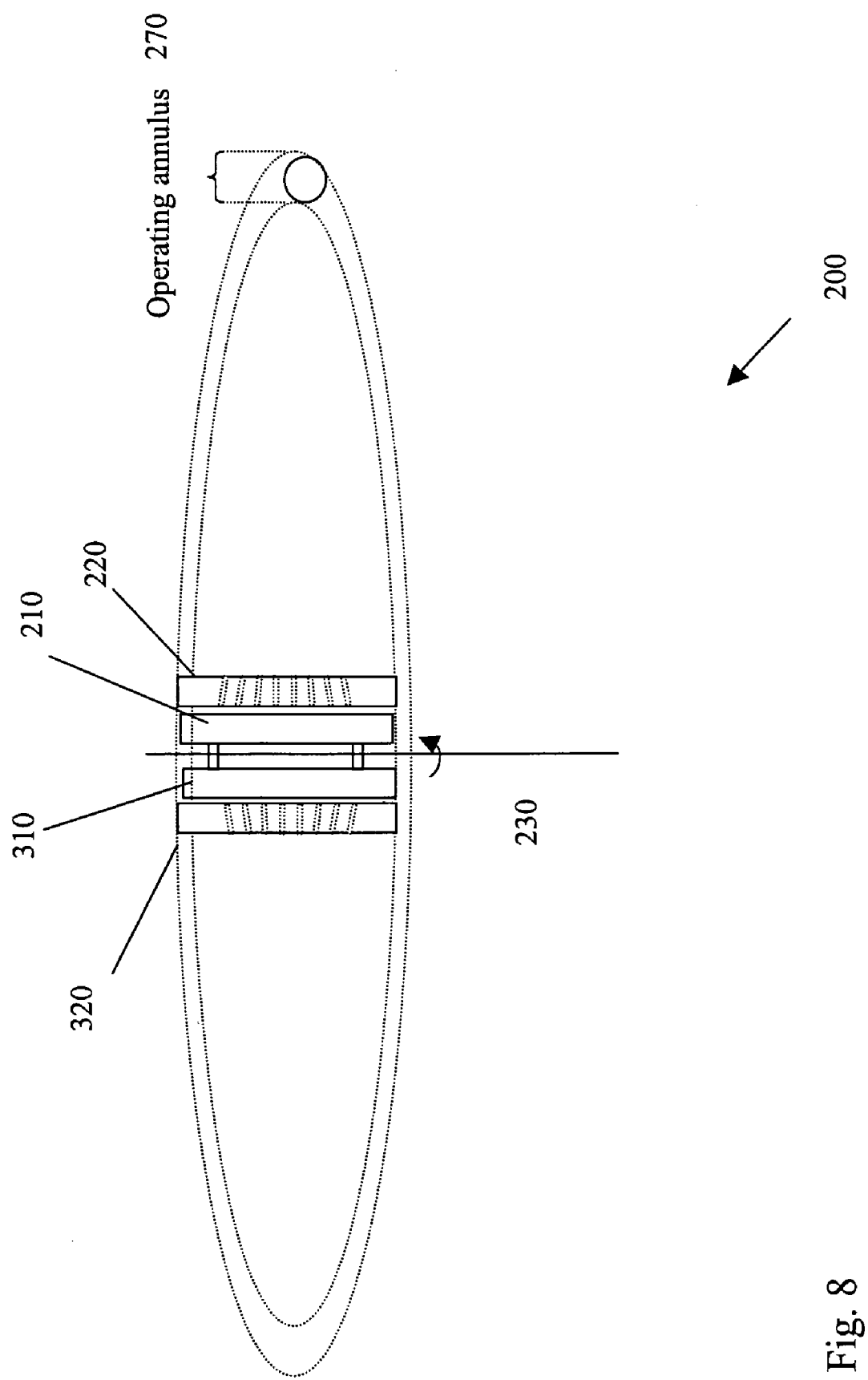
FIG. 8 is a diagram illustrating the operating annulus of the three-dimensional rendering device of FIG. 5.

When the cones of illumination are converging from the tube-like voids, there may be a particular distance from microchannel collimating array 220, from which viewing quality is optimized. This may be the distance at which the converging cones of illumination just overlap. For example, if the viewer approaches the three-dimensional rendering device too closely, then the cones of illumination may not fall onto his eye as intended. This is particularly true of three-dimensional rendering device 200 illustrated in FIG. 4. On the other hand, if the viewer is located at a position relatively distant from three-dimensional rendering device 200, the cone of illumination of the pixels may overlap both of the viewer's eyes, degrading the stereoscopic effect. Thus, the optimum distance for viewing defines an operating annulus 270 centered on axis of rotation 230 of three-dimensional rendering device 200. The operating annulus is illustrated in FIG. 8.

According to the description given above, there are about $N=2\pi R/W$ sweet spots located around operating annulus 270, where R is the radius of the operating annulus and W is the separation on the annulus between the displayed images. The number of sweet spots N also determines the refresh rate required of three-dimensional rendering device 200. For example, if the viewers are located at a comfortable viewing distance, say 50 cm, from three-dimensional rendering device 200, and their eyes are separated by a nominal distance of about 6 cm, the refresh rate of the device may be about 50 refresh cycles/revolution. Therefore, if three-dimensional rendering device 200 is spinning at a rate of 30 Hz, the refresh frame rate for pixel 241 may be about 1500 Hz. Higher refresh rates allow more numerous sweet spots. Thus, 3000 Hz would provide twice as many sweet spots.

Because the viewer's eye may only receive light over a fraction of a full revolution of three-dimensional rendering device 200, the intensity of flat panel displays 210 and 310 may be higher than the intensity used for continuous viewing of flat panel displays 210 and 310, to obtain the same perceived image intensity. In fact, if the viewer only receives light from the display while the angular position of the display is within the sweet spot, the viewer's eyes will not be illuminated for more than $\frac{1}{50}^{th}$ of a full revolution. However, because this intensity is emitted into the narrow solid angle of the cone of illumination, the actual pixel intensity may not need to be substantially higher than that in currently available displays. The critical parameter is the total illumination reaching the viewer's eye. The illumination can be emitted in very brief, bright flashes or in longer, less bright emission.

Since three-dimensional rendering device 200 includes two displays 210 and 310, and two microchannel collimating arrays 220 and 320, the viewer will see an image twice per full rotation of three-dimensional rendering device 200. In general, the greater the number of display devices 210, the slower device 200 needs to rotate to maintain a given frame refresh rate for the viewer. Therefore, in order to project a moving image, display 310 may show information from the subsequent frame compared to the information being shown by display 210. Display 210 may then be updated with information corresponding to the next frame of information after that being shown by display 310. The frame rate of the displayed video image perceived by a viewer located in a sweet spot is therefore twice the rotation rate of the device 200.

Figure 9:
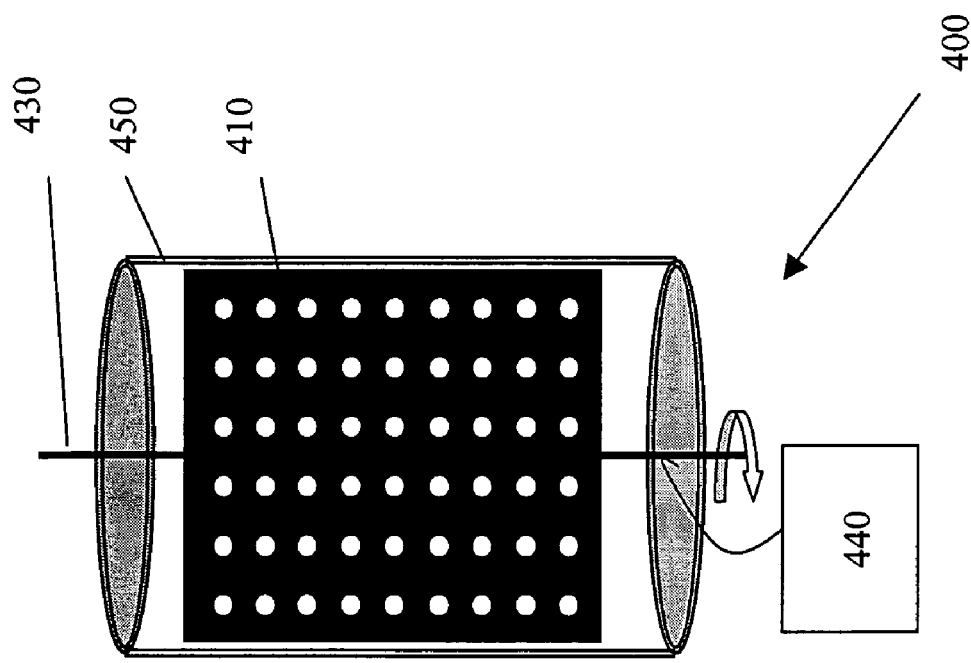
FIG. 9 is a diagram of an exemplary structure for a three-dimensional rendering device within a rotating cylinder.
Figure 9:
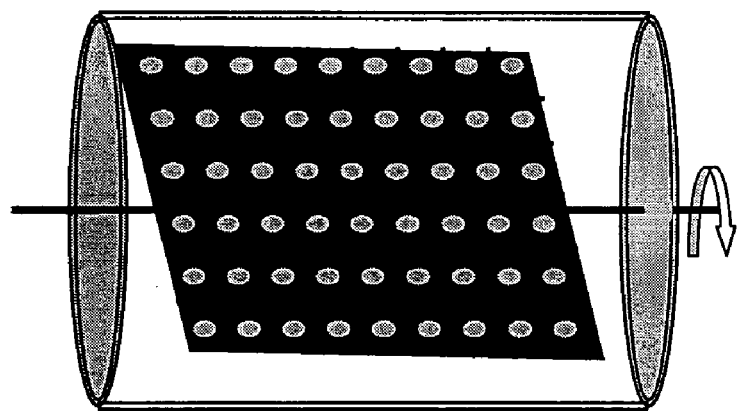

FIG. 9 depicts another exemplary three-dimensional rendering device 400. Three-dimensional rendering device 400 is similar to three-dimensional rendering device 1, 100, or 200, except that three-dimensional rendering device 400 is enclosed in a rotating cylinder 450. Rotating cylinder 450 may be coupled to a shaft 430, which may be rotated by a motor 440. Inclusion of rotating cylinder 450 reduces the air resistance of the rotating flat panel 410, and ameliorates safety issues in connection with the rotating panel 410. In particular, rotating cylinder 450 prevents viewers from approaching too closely to the three-dimensional rendering device 400, and thereby suffering an impact with the rotating panel 410.

Figure 10:
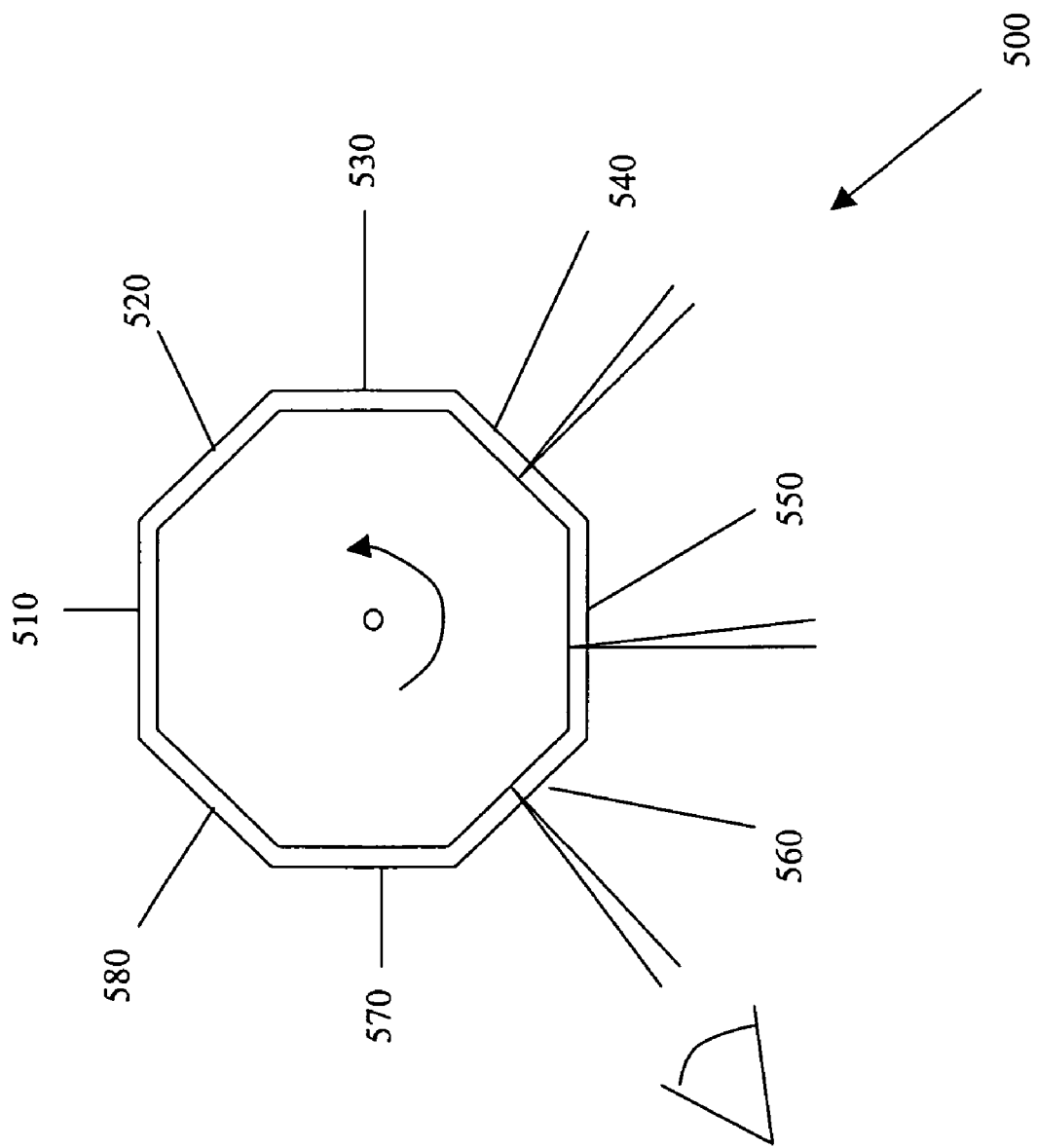
FIG. 10 illustrates another exemplary three-dimensional rendering device, using a plurality of flat panels.

FIG. 10 shows another exemplary three-dimensional rendering device 500. Three-dimensional rendering device 500 comprises a plurality of flat panels 510-580, which are arranged, for example, in an octagon, shown in cross section in FIG. 10. The plurality of flat panels 510-580 increases the frame rate of three-dimensional rendering device 500 at a given rotation rate. For example, if three-dimensional rendering device 500 rotates at 5 Hz, and has eight panels as shown in FIG. 10, the frame rate may be 40 Hz, which is higher than a television video frame rate. Therefore, no flicker is apparent in three-dimensional rendering device 500, even at such relatively low rotation rates. The number of panels included in three-dimensional rendering device 500 is only limited by practical considerations, such as the data rate required to send different image information to each of the panels 510-580, and the electronic circuitry required to drive the plurality of panels.

Figure 11:
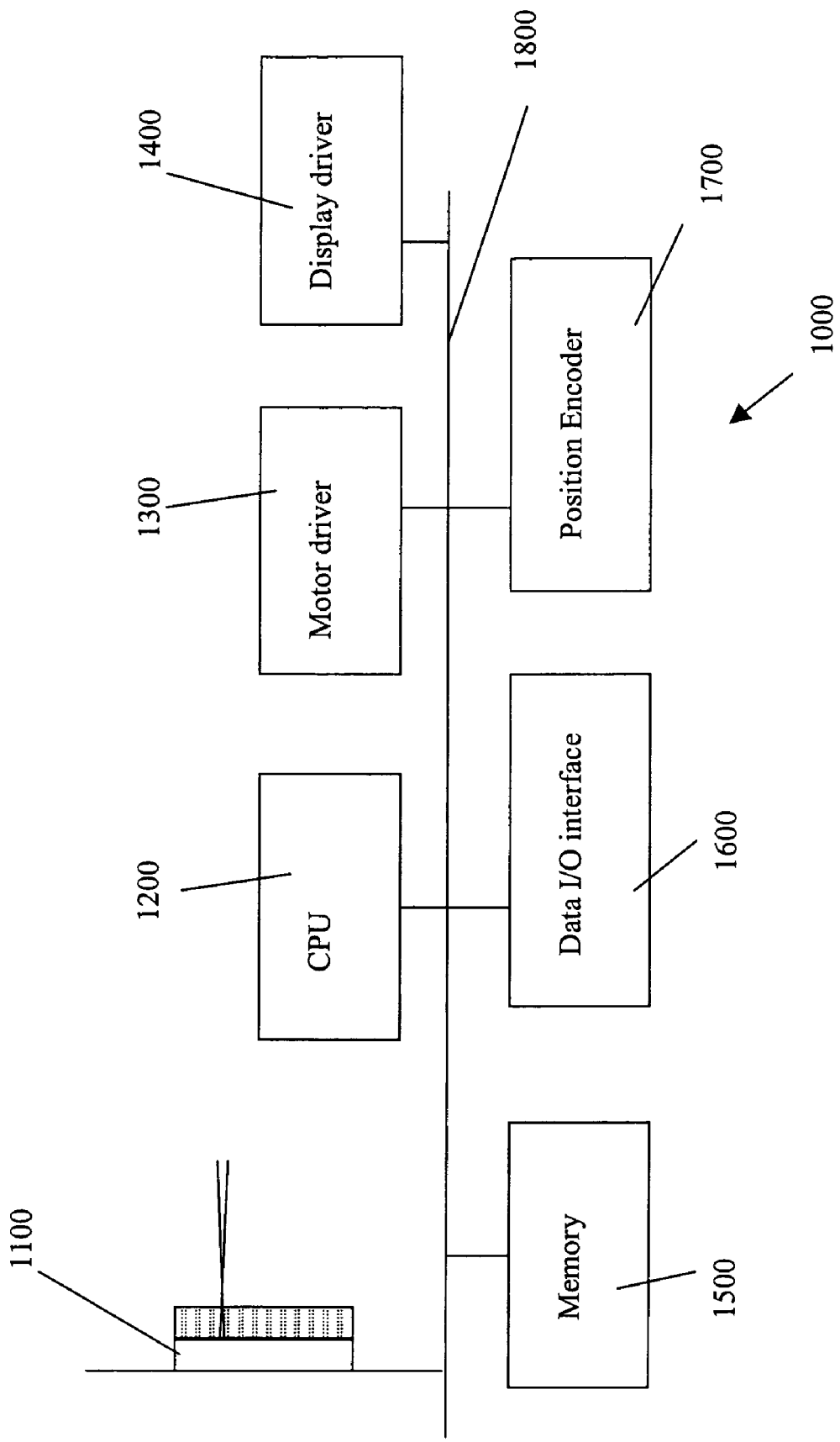
FIG. 11 is an exemplary diagram of a system for controlling a three-dimensional rendering device.

FIG. 11 illustrates an exemplary system 1000 for controlling a three-dimensional rendering device 1100. The system 1000 includes three-dimensional rendering device 1100, controller 1200, motor driver 1300, display driver 1400, memory 1500, input/output interface 1600, and rotary position encoder 1700. The aforementioned units 1100-1700 may be coupled on bus 1800, or may be integrated into an application-specific integrated circuit (ASIC), for example.

Units 1200-1700 may be implemented as software stored in memory 1500 and executing on controller 1200, or may be implemented as hardware circuits, for example, in an application-specific integrated circuit (ASIC). Any hardware or software implementation which performs the function of units 1200-1700 may be used.

Controller 1200 may be coupled to three-dimensional rendering device 1100, for example, through bus or cable 1150. Three-dimensional rendering device 1100 may be, for example, any of three-dimensional rendering devices 10-500. Controller 1200 may format and control the transmission of image data stored in memory 1500, to three-dimensional rendering device 1100, via display driver 1400. Rotary position encoder 1700 may provide information to controller 1200 regarding the rotary position of three-dimensional rendering device 1100. Based on the rotary position, the controller 1200 may direct display driver 1400 to display the appropriate image information on three-dimensional rendering device 1100. Display driver 1400 may direct three-dimensional rendering device 1100 to refresh the display of information, when the rotary position of three-dimensional display 1100 enters another sweet spot position. When rotary position encoder 1700 determines that three-dimensional rendering device 1100 has completed a full revolution, the controller 1200 may retrieve a new frame of information from memory 1500, and may deliver the new frame information to three-dimensional rendering device 1100.

The image data stored in memory 1500 may be image information generated by video cameras, for example, and processed by an image processor, to generate image information appropriate for a viewer located at a particular viewing location. Alternatively, the image data may be generated by an image processing device based on knowledge of the location of the surface of an object, for example, an object being designed with computer aided design (CAD) tools. The image data generated by the image processor may be stored in non-volatile storage such as tape or disk storage, and input to local memory 1500 through input/output interface 1600.

Figure 12:
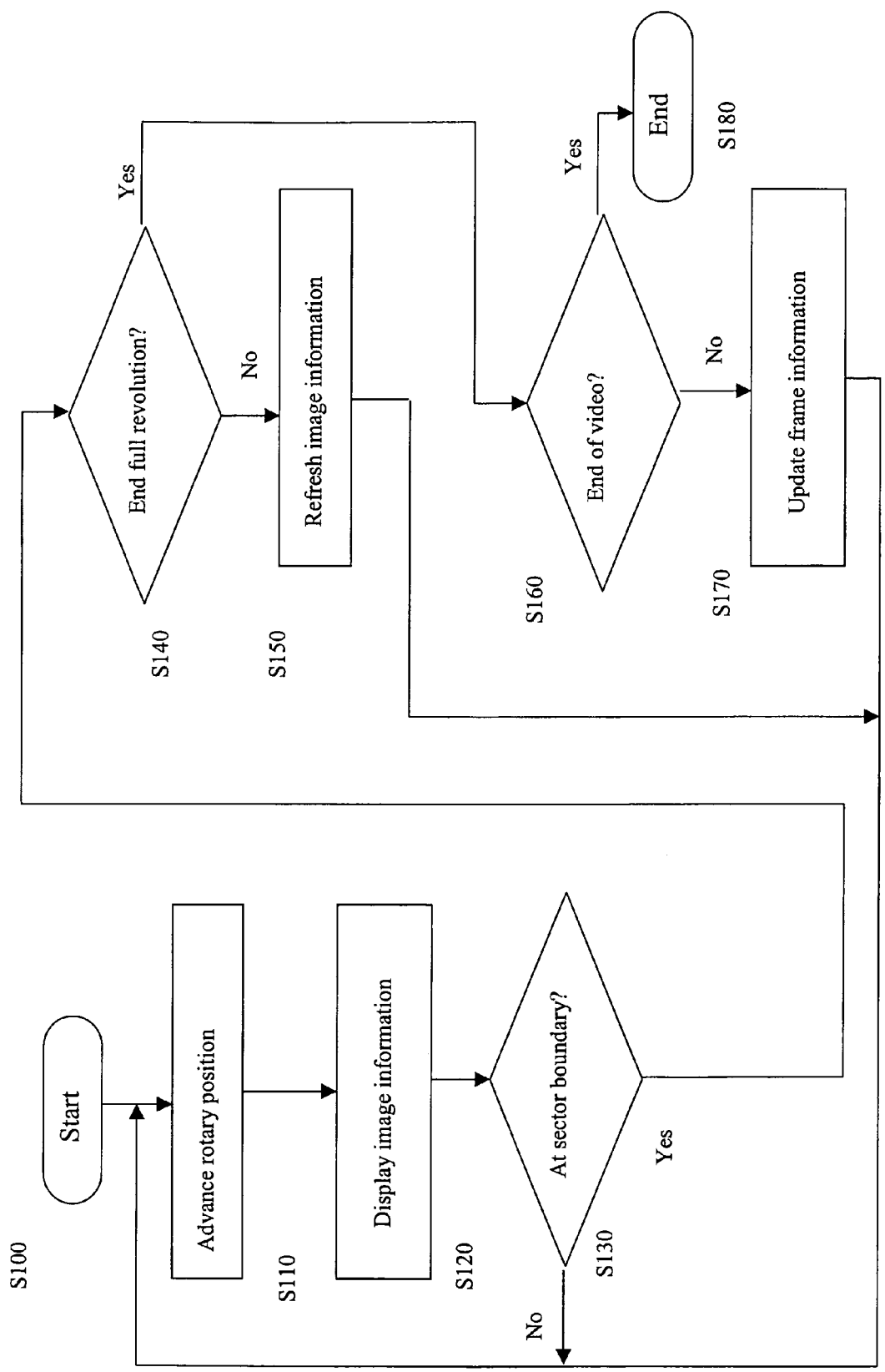
FIG. 12 is an exemplary method for generating a three-dimensional image using a three-dimensional rendering device.

FIG. 12 shows an exemplary method for displaying three-dimensional information with a three-dimensional rendering device. The process begins in step S100 and continues to step S110, where the rotary position is advanced. In step S120, the display information is displayed by the three-dimensional rendering device.

In step S130, a determination is made whether the position of the three-dimensional rendering device is such that the end boundary of a sweet spot has been encountered. If not, the process returns to step S110 and S120, wherein the rotary position is advanced and display information is displayed. If the end boundary of a sweet spot has been encountered, then a determination is made whether a full revolution has been completed in step S140. If not, the information is refreshed with display information corresponding to the next sweet spot in step S150. If a full revolution has been completed, a determination is made whether the end of the video has been encountered in step S160. If not, the frame information is updated and control returns to step S110, where the rotary position is advanced. If the end of the video has been encountered in step S160, then the process ends in step S180.

The method depicted in FIG. 12 is only exemplary, and many alternatives may be envisioned. For example, in step S140 of the method shown in FIG. 12, the frame information may be updated after completion of a full rotation. However, alternatively, the frame information may be updated at arbitrary intervals, either less than or greater than a full rotation. The interval of a 360 degree full rotation is shown as an example, as it may be a particularly convenient implementation.

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. Accordingly, the exemplary details set forth above are intended to be illustrative, not limiting.

What is claimed is:

1. A three-dimensional image rendering device, comprising:
    at least one movable light-emitting pixel array displaying different image data as a function of position of the at least one light-emitting pixel array; and
    at least one array of collimators disposed adjacent to the movable light-emitting pixel array, having at least one collimator which collimates light from the light-emitting pixel array, and directs rays of light from the light-emitting pixel array into a limited cone of illumination which allows the different image data to be viewed only at respective different locations of a viewer at a preferred viewing distance,
    wherein each collimator of the array of collimators corresponds to only one pixel of the pixel array and is used to direct light from the corresponding pixel without knowing the viewer's angular position relative to the pixel array while the pixel array is rotating.

2. The device of claim 1, further comprising:
    a motor that rotates the at least one light-emitting pixel array and the at least one array of collimators about a vertical axis in the plane of said display.

3. The device of claim 1, wherein the predefined viewing distance is about 50 cm.

4. The device of claim 1, wherein the at least one light-emitting pixel array and the at least one array of collimators comprise at least one rotatable flat panel.

5. The device of claim 4, wherein the at least one light-emitting pixel array and the at least one array of collimators comprise at least three light-emitting display sources, arranged as a rotatable polygon.

6. The device of claim 1, wherein at least a portion of the collimators in the collimator array are aligned so that their cones of illumination overlap a same spot.

7. The device of claim 1, wherein the array of collimators comprises at least one of a lenslet array and a microchannel collimating array.

8. The device of claim 1, wherein the at least one light-emitting pixel array comprises an array of light emitting diodes, and the collimators of the at least one array of collimators are registered over at least one of light emitting diodes.

9. The device claim of claim 1, wherein the at least one array of collimators comprises an array of lenslets, and the at least one light-emitting pixel array comprises an array of laser diodes, wherein at least one lenslet is offset from an optical axis of at least one laser diode to project light from the laser diode into a cone of illumination which overlaps a cone of illumination of light from an adjacent laser diode.

10. The device of claim 1, wherein a first collimator and a second collimator of the at least one collimator have their central optical axes non-parallel to each other such that a light beam from the first collimator converges with a light beam from the second collimator.

11. The device of claim 1, wherein the array of collimators is disposed on an outer flat surface of the light-emitting pixel array.

12. A system for rendering a three-dimensional image, comprising:
- a movable display having a pixel array for displaying different image information as a function of position of the display;
- at least one collimating array, which directs light from the display into a limited cone of illumination which allows the different image information to be viewed by a viewer from different locations adjacent to the display;
- a motor for moving the display through a first and a second predefined position; and
- a controller which directs the display to display only first image information while the display is moved through the first predefined position, and to display only second image information while moving the collimator array through the second predefined position, the second image information being different from the first image information,
- wherein each collimator of the array of collimators corresponds to only one pixel of the pixel array and is used to direct light from the corresponding pixel without knowing the viewer's angular position relative to the pixel array while the pixel array is rotating.

13. The system of claim 12, wherein the first predefined position is the position at which the cone of illumination overlaps one of a viewer's eyes, and the second predefined position is the position at which the cone of illunmination overlaps another of the viewer's eyes.

14. The system of claim 12, further comprising a position encoder which indicates to the controller a position of the display.

15. The system of claim 14, wherein the controller updates the image information at a predefined position as indicated by the position encoder.

16. The system of claim 15, wherein the motor rotates the display on a rotation axle, and the predefined position is a full rotation of the display.

17. A method for rendering a three-dimensional image to be viewed by a viewer, comprising:
- displaying only first image information from a pixel array through a collimator array while moving the pixel array and collimator array through a first predefined position; and
- displaying only second image information through the collimator of the collimator array while moving the pixel array and collimator array through a second predefined position,
- wherein each collimator of the array of collimators corresponds to only one pixel of the pixel array and is used to direct light from the corresponding pixel without knowing the viewer's angular position relative to the pixel array while the pixel array is rotating.

18. The method of claim 17, wherein the first predefined position is the position over which a cone of illumination overlaps one of the viewer's eyes, and the second predefined position is the position over which a cone of illumination overlaps another of the viewer's eyes.

19. The method of claim 17, wherein the first image information is image information intended for the viewer's left eye and the second image information is image information intended for a viewer's right eye.

20. The method of claim 19, further comprising displaying a new frame of image information after a full revolution of the pixel array and collimator array.

21. The method of claim 17, wherein moving the pixel array and collimator array comprises rotating the pixel array and collimator array.

22. The method of claim 21, wherein rotating the pixel array and collimator array comprises rotating the pixel array and collimator array at a rate which allows a non-flickering display of image information.

* * * * *

UNITED STATES PATENT AND TRADEMARK OFFICE
CERTIFICATE OF CORRECTION

PATENT NO. : 7,250,954 B2  
APPLICATION NO. : 11/012477  
DATED : July 31, 2007  
INVENTOR(S) : David K. Biegelsen Page 1 of 1

It is certified that error appears in the above-identified patent and that said Letters Patent is hereby corrected as shown below:

On the Title Page Please delete the following:

Item (73) Assignee: Palo Alto Research Center, Incorporated, Palo Alto, CA (US)

On the Title Page And Replace with the following:

Item (73) Assignee: Palo Alto Research Center Incorporated, Palo Alto, CA (US)

Signed and Sealed this

Fourteenth Day of October, 2008

JON W. DUDAS  
*Director of the United States Patent and Trademark Office*